US011358498B2

(12) United States Patent
Speck

(10) Patent No.: US 11,358,498 B2
(45) Date of Patent: Jun. 14, 2022

(54) LONGITUDINAL ADJUSTMENT DEVICE FOR A VEHICLE SEAT, HAVING A FLOOR RAIL, A LONGITUDINALLY SLIDABLE SEAT RAIL AND A LOCKING UNIT

(71) Applicant: FISHER DYNAMICS GERMANY GMBH, Wuppertal (DE)

(72) Inventor: Axel Speck, Pinneberg (DE)

(73) Assignee: FISHER DYNAMICS GERMANY GMBH, Wuppertal (DE)

(*) Notice: Subject to any disclaimer, the term of this patent is extended or adjusted under 35 U.S.C. 154(b) by 0 days.

(21) Appl. No.: 16/971,827

(22) PCT Filed: Mar. 1, 2019

(86) PCT No.: PCT/EP2019/055173
§ 371 (c)(1),
(2) Date: Aug. 21, 2020

(87) PCT Pub. No.: WO2019/170547
PCT Pub. Date: Sep. 12, 2019

(65) Prior Publication Data
US 2021/0078454 A1 Mar. 18, 2021

(30) Foreign Application Priority Data

Mar. 7, 2018 (DE) ...................... 10 2018 105 251.0

(51) Int. Cl.
*B60N 2/08* (2006.01)
*B60N 2/07* (2006.01)
(52) U.S. Cl.
CPC ......... *B60N 2/0843* (2013.01); *B60N 2/0705* (2013.01)
(58) Field of Classification Search
CPC ............................ B60N 2/0843; B60N 2/0705
See application file for complete search history.

(56) References Cited

U.S. PATENT DOCUMENTS 4,238,099 A 12/1980 Hunwicks
5,918,846 A * 7/1999 Garrido .................. B60N 2/123
248/429

(Continued)

FOREIGN PATENT DOCUMENTS

CN 101337516 A 1/2009
CN 201753030 U 3/2011

(Continued)

OTHER PUBLICATIONS

International Search Report dated Jun. 28, 2019 re: Application No. PCT/EP2019/055173, pp. 1-2, citing: WO 2014135145 A1, DE 10201421731 A1, DE 10040593 A1.

(Continued)

*Primary Examiner* — Anita M King
(74) *Attorney, Agent, or Firm* — Cantor Colburn LLP

(57) ABSTRACT

A vehicle seat longitudinal adjustment device has a floor rail, a seat rail, and a locking unit substantially accommodated in a cavity formed by the rails, and a housing. A bearing shaft is disposed in this housing and extends in the displacement direction. The device includes at least two flat blocking parts, pivotable independently of each other about the bearing shaft and elastically biased, independently of each other, by one blocking spring each, and a releasing part. The structurally identical blocking parts each have two arms, between which the bearing shaft is located. The seat rail has, for each blocking part, shear slots accommodating the first and second arms. The floor rail has a perforated strip cooperating with the first arms, with first blocking slots, and a perforated strip cooperating with the second arms, with second blocking slots. The slots are periodically disposed one behind the other in the displacement direction.

18 Claims, 5 Drawing Sheets

(56) References Cited

U.S. PATENT DOCUMENTS

| | | | | |
|---|---|---|---|---|
| 5,918,847 | A * | 7/1999 | Couasnon | B60N 2/0705 |
| | | | | 248/430 |
| 6,354,553 | B1 * | 3/2002 | Lagerweij | B60N 2/0715 |
| | | | | 248/429 |
| 8,573,698 | B2 * | 11/2013 | Wojatzki | B60N 2/0705 |
| | | | | 297/344.1 |
| 2009/0007718 | A1 * | 1/2009 | Beneker | B60N 2/0818 |
| | | | | 74/535 |

FOREIGN PATENT DOCUMENTS

| | | |
|---|---|---|
| CN | 103003095 A | 3/2013 |
| CN | 104816651 A | 8/2015 |
| CN | 107009919 A | 8/2017 |
| CN | 107627909 A | 1/2018 |
| DE | 2729770 C2 | 3/1982 |
| DE | 10040593 A1 | 3/2002 |
| DE | 102008017007 A1 | 1/2009 |
| DE | 102014217331 A1 | 3/2016 |
| WO | 2014135145 A1 | 9/2014 |

OTHER PUBLICATIONS

CN Office Action dated Feb. 21, 2022 re: Application No. 201980017289.9, pp. 1-6, citing: WO2014135145A1, CN107627909A, US4238099A, CN107009919A, CN104816651A, CN103003095A, CN201753030U, CN101337516A, DE102014217331A1, US2011193389A1 and US5918846A.

\* cited by examiner

LONGITUDINAL ADJUSTMENT DEVICE FOR A VEHICLE SEAT, HAVING A FLOOR RAIL, A LONGITUDINALLY SLIDABLE SEAT RAIL AND A LOCKING UNIT

TECHNICAL FIELD

The disclosure relates to a longitudinal adjustment device for a vehicle seat having a floor rail, a longitudinally displaceable seat rail and a locking unit.

BACKGROUND

A conventional adjustment device found in WO 2014, 135145 has a first arm of each blocking part, in the locking position, that reaches through the first shear slot of the seat rail associated with it, into a hole of the first perforated strip. The opposite second arm reaches through the second shear slot associated with it, between two latching webs of a latching strip configured in the manner of a comb. There, in case of a load in the displacement direction, the retention of the arm is weaker than on the other side. Already in the event of minor accidents, e.g. a small frontal collision or a corresponding rear impact, at least one of the latching webs respectively subjected to load is deformed, whereas a similar deformation cannot be found in the holes. The deformation on the two sides of the bearing shaft is non-uniform. This results in a load on the bearing shaft. It is bent slightly towards the side. As a result, the pivoting movement of at least one of the blocking parts about the shaft may be impeded and limited.

However, the functioning of the longitudinal adjustment device requires that each individual blocking part can snap into the locking position freely and unimpededly under the force of the respective blocking spring. The locking action is ensured only if the locking position is reached completely in each individual case. The locking action is a crucial safety feature.

In an actual crash which, in contrast to a minor accident, is understood to be an accident in which safety elements, such as airbags, respond, the bearing shaft is deformed to a much more significant extent. In that case, a free pivoting movement of the blocking part is no longer ensured, as a rule. In that case, however, the vehicle is damaged to such an extent that significant repair work has to be carried out; at least, the longitudinal adjustment device has to be replaced. In contrast, the longitudinal adjustment device is not inspected or indeed repaired after a minor accident. If its locking unit functions only to a limited extent, e.g. if a blocking part partially jams, serious accidents may result. In that case, the motor vehicle seat is no longer connected to the floor assembly of the motor vehicle in a sufficiently secure manner.

In its FIG. 1, DE 27 29 770 C2 shows a locking unit for the longitudinal adjustment of a motor vehicle seat with two blocking part that are biased independently of one another into the locking position, which is normally provided. These blocking parts can be brought into the releasing position by means of a pivoting movement of a support shaft, which is not shown in FIG. 1, against the action of blocking springs that are not shown. The blocking parts are disposed so as to be pivotable about this support shaft; the support shaft extends parallel to the displacement direction. A different locking device is shown in FIGS. 2 and 3; this time, it does not have any pivotable blocking parts but blocking pins, which are displaceable in their longitudinal direction and biased individually by one blocking spring each. In this design, the support shaft is replaced by longitudinal guides. The disclosure does not relate to devices with blocking pins of this type, i.e. to multi-pin locking devices.

A locking unit for longitudinal adjustment whose blocking parts have only one arm is known from DE 10 2008 017 007 A1. Here, the load on the bearing shaft transverse to the displacement direction is greater in any kind of accident than in WO 2014/135 145 A1, so that the problems described above become even more evident.

SUMMARY

This disclosure avoids the above-mentioned drawbacks of the known longitudinal adjustment device and develops the latter in such a way that, if a load is present, a transverse force on the bearing shaft remains small and is excluded if possible, and that, if possible, no concealed adverse effect on the function of each individual blocking part occurs.

This is achieved by providing a longitudinal adjustment device for a vehicle seat having a floor rail, a seat rail that is longitudinally displaceable relative to the latter in a displacement direction, and a locking unit connected to the seat rail and substantially accommodated in a cavity formed by the two rails, wherein the locking unit has a housing, a bearing shaft disposed in this housing and extending in the displacement direction, at least two flat blocking parts, which are disposed so as to be pivotable independently of each other about the bearing shaft and which are elastically biased, independently of each other, into a normally existing locking position by one blocking spring each, and a releasing part moving the blocking parts into a releasing position against the force of their blocking springs, wherein the structurally identical blocking parts each have a first arm and a second arm, between which the bearing shaft is located, and a releasing region cooperating with the releasing part, wherein the seat rail has, for each blocking part, one first shear slot freely accommodating the first arm and one second shear slot freely accommodating the second arm, and wherein the floor rail has a first perforated strip, which cooperates with the first arms, with first blocking slots periodically disposed one behind the other in the displacement direction, and a second perforated strip, which cooperates with the second arms, with second blocking slots periodically disposed one behind the other in the displacement direction.

Since the two arms of each blocking part each reach into a blocking slot of the associated perforated strip, the retention of the two arms has the same quality; the load in the case of an accident is substantially preferably symmetrical to the bearing shaft. A transverse load on the bearing shaft, and thus the deformation of the latter, particularly the deformation in the y-direction, is thus avoided.

In an advantageous refinement, perpendicular to the displacement direction, a structurally identical second blocking slot is located opposite each individual first blocking slot. An identical retention on both sides of the bearing shaft is thus improved. Preferably, each blocking part is associated with a first and a second shear slot in the seat rail. The arms are located in the respective shear slot both in the locking position and in the releasing position. The blocking action in the event of an accident takes place in the preferably narrow gap between the shear slot and the blocking slot. As a result, large locking forces can already be obtained with relatively thin blocking parts.

Preferably, in the locking position, the partial region of the first arm reaching into a first blocking slot is offset relative to the partial region of the second arm of the same blocking part reaching into a second blocking slot by 180° with respect to the bearing shaft. The bending forces on the bearing shaft are reduced also in this way, the latter is not bent transversely to the longitudinal direction of the blocking parts, i.e. particularly not in the z-direction.

Advantageously, in the locking position, the clear distance between a first shear slot and the first perforated strip adjacent thereto and/or the clear distance between a second shear slot and the second perforated strip adjacent thereto is less than 10%, in particular less than 5% of the largest dimension of the blocking part determined transversely to the displacement direction. The smaller the distance between the blocking slot of the perforated strip and the shear slot, the less material of the blocking slot is necessary to absorb an accident-related load.

In a particularly preferable improvement, the first perforated strip and/or the second perforated strip are located in a profiled region of the floor rail in which the profile is bent by at least 90° about an axis extending parallel to the displacement direction. Due to the deformation, the perforated strip is very rigid; it is capable of absorbing greater forces than without the bend. Preferably, both perforated strips are bent, if possible in the same manner, so that they have as identical a rigidity as possible. A deformation of the perforated strip during an accident is counteracted by the bend. This also applies, mutatis mutandis, for the shear slots. It is advantageous if the first shear slot and/or the second shear slot of each individual blocking part is located in a profiled region of the seat rail in which the profile is bent by at least 45, in particular by at least 70° about an axis extending parallel to the displacement direction.

It is advantageous if both profiled regions of the seat rail in which the shear slots are located are bent, if possible in the same manner, particularly with the same shape. Preferably, the two perforated strips are configured in the same manner, i.e. bent in the same way, and at the same time, the two profiled regions of the seat rail in which the shear slots are located are bent in the same manner. Preferably, the curvature direction is identical in each case. Preferably, the profiled region of the seat rail forms a closer curvature, over which the bend of the perforated strip reaches at a short distance; both in the same manner on the first and the second side. Due to the bend of the perforated strip, the respective arm of the blocking part penetrates a blocking slot to a considerable extent already at a small pivot angle. This is the case particularly if its movement is directed towards a crest line of the bend, in particular towards the center of the curvature of the bend. When engaging, it then moves towards the profile substantially transversely, and not at an acute angle to the profile, as is the case in the engagement between latching webs according to the prior art. All this results in a particularly rugged lock.

Preferably, the two shear slots of each individual blocking part are located at the same distance from the bearing shaft with a deviation of plus/minus 5%. This also applies to the perforated strips. It is advantageous if the latter are located outside the shear slots. It is advantageous if the locking conditions are as identical as possible for both arms of a blocking part. This is accomplished with a symmetrical configuration of the longitudinal adjustment device.

Preferably, the two rails have a first clasping region and a second clasping region: they are mutually hooked into one another in both of them. Preferably, guide means are located in at least one clasping region. Preferably, the first perforated strip is located in the immediate vicinity of the first clasping region and/or the second perforated strip in the immediate vicinity of the second clasping region. In this case, it is to be preferred that the distance of at least one perforated strip from a closest guide means is smaller by at least 30% than the distance of this perforated strip from the bearing shaft.

In the event the two rails are mutually hooked into one another in a first clasping region and in a second clasping region, it is advantageous if the first shear slots are located in the immediate vicinity of the first clasping region and/or the second shear slots are located in the immediate vicinity of the second clasping region, in particular, if their distance from a guide means is maximally 30% of their distance from the bearing shaft.

The profiles of the rails have a high level of stability in the clasping regions. It is thus used for locking in a favorable manner.

Advantageously, with respect to the bearing shaft, the first perforated strip is offset relative to the second perforated strip by 180° plus/minus maximally 10°, preferably plus/minus maximally 5°, in the x-z-plane. A load on the bearing shaft in a direction transverse to the longitudinal direction of the blocking parts, particularly in the z-direction, is thus reduced. A corresponding advantage is obtained if, with respect to the bearing shaft, the first shear slot of a blocking part is offset relative to the second shear slot of this blocking part by 180° plus/minus maximally 10°, preferably 180° plus/minus maximally 5° about the bearing shaft.

BRIEF DESCRIPTION OF THE DRAWINGS

Other advantages and features of the disclosure become apparent from the rest of the claims as well as from the following description. An exemplary embodiment of the disclosure is explained below, this is done with reference to the drawing. This exemplary embodiment is not supposed to be understood to be limiting. The Figures of the drawing show:

DETAILED DESCRIPTION OF THE DRAWINGS

Figure 1:
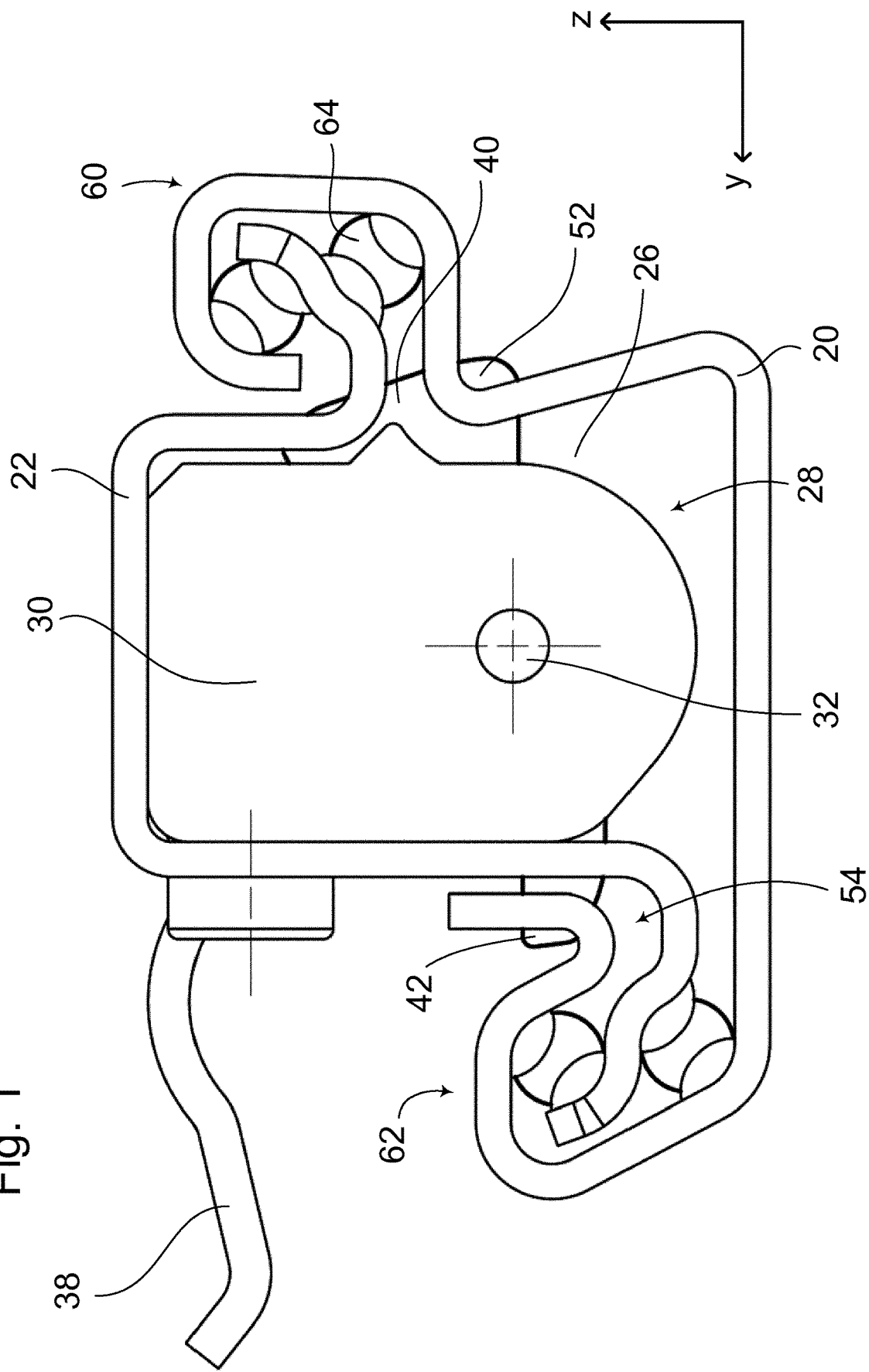
FIG. 1 a frontal view of the longitudinal adjustment device viewed in the x-direction, FIG. 2 a perspective view of a floor rail, FIG. 3 a view as in FIG. 1, but as a section through the locking unit, FIG. 4 a perspective view of a locking unit, and FIG. 5 an exploded view of the locking unit according to FIG. 4.
Figure 2:
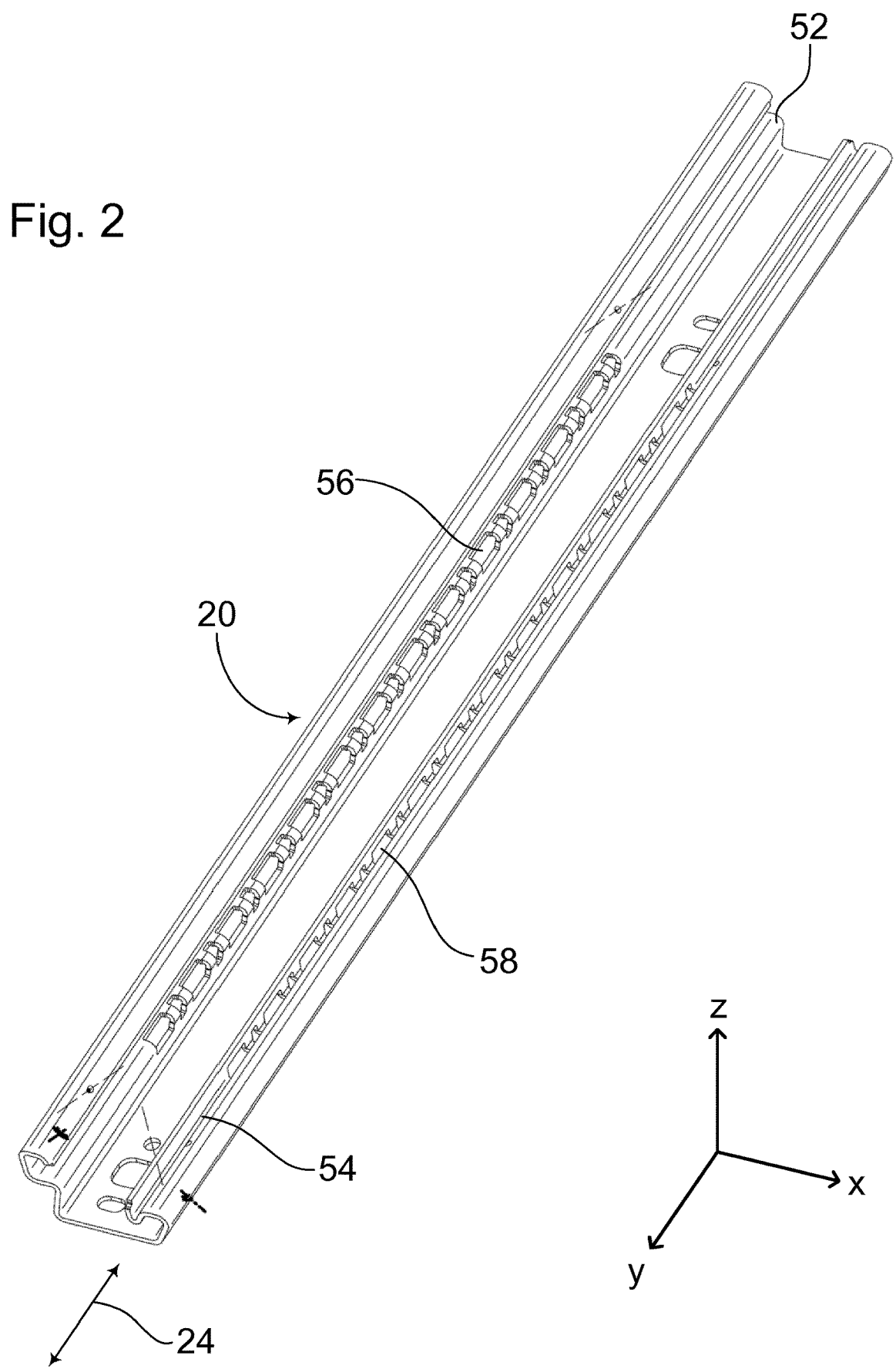

A right-handed orthogonal x-y-z coordinate system as it is commonly employed in the automotive field is used for the description. The positive direction of the x-axis points forward in the direction of travel, the y-axis defines the plane of travel together with the x-axis, the positive direction of the z-axis points perpendicularly upwards from this plane of travel. Generally, longitudinal adjustment devices are disposed in vehicles in a slightly inclined manner, rising towards the front. The displacement direction, which is situated in the xz-plane, is offset by a few degrees relative to the x-direction. In order to simplify the description, it is assumed below that the displacement direction extends in the x-direction.

The longitudinal adjustment device for a vehicle seat, which is not shown here and is known from the prior art, has a floor rail 20 and a seat rail 22. The two are displaceable relative to one another in the displacement direction 24; in this case, the floor rail 20 is generally stationary, the seat rail 22 is displaceable relative thereto. The two rails 20, 22 delimit a cavity 26 that is open only in the x-direction. A locking unit 28 of the longitudinal adjustment device is accommodated in the latter. That is connected to the seat rail 22; in the exemplary embodiment it is screwed thereto.

Figure 3:
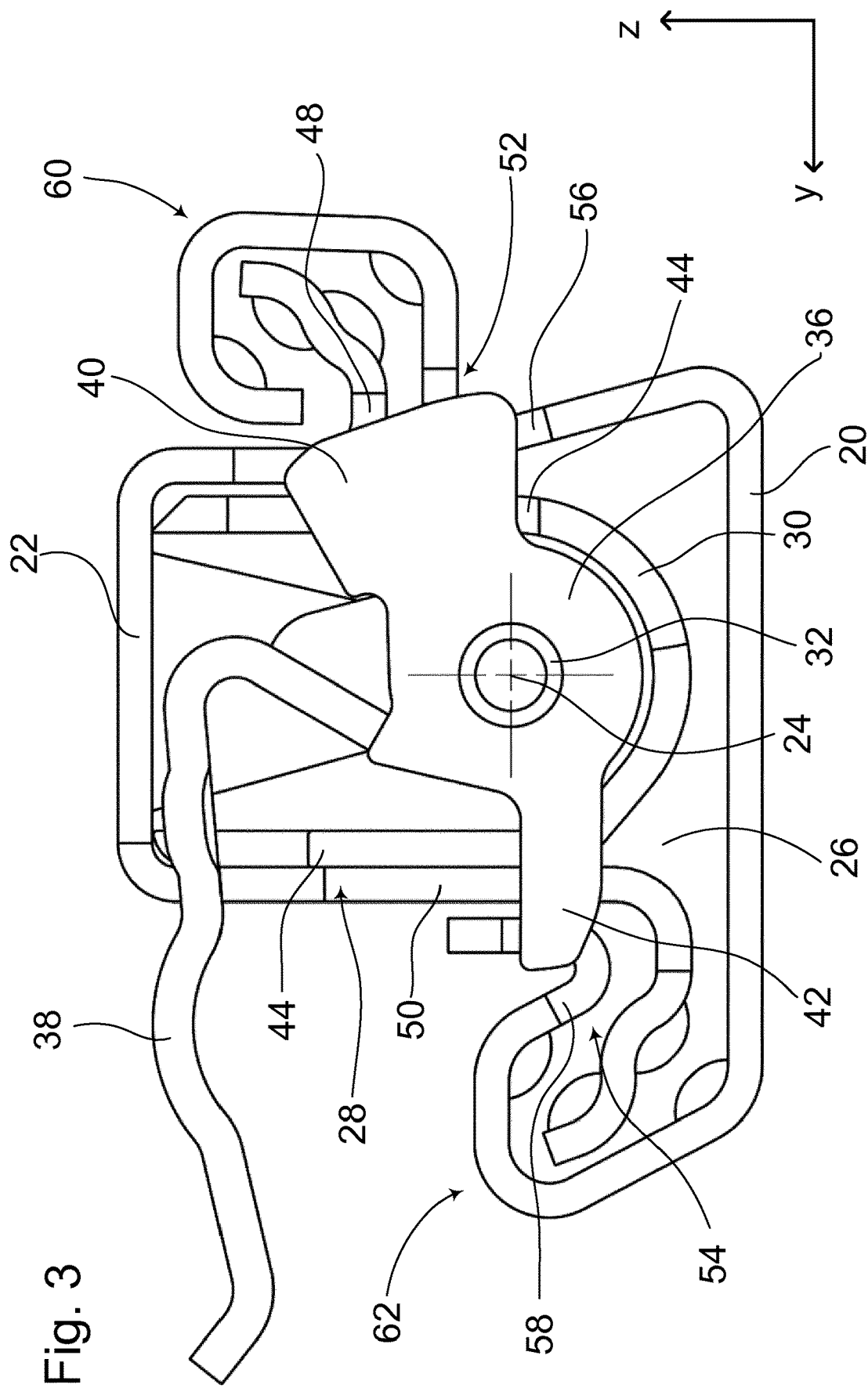
Figure 4:
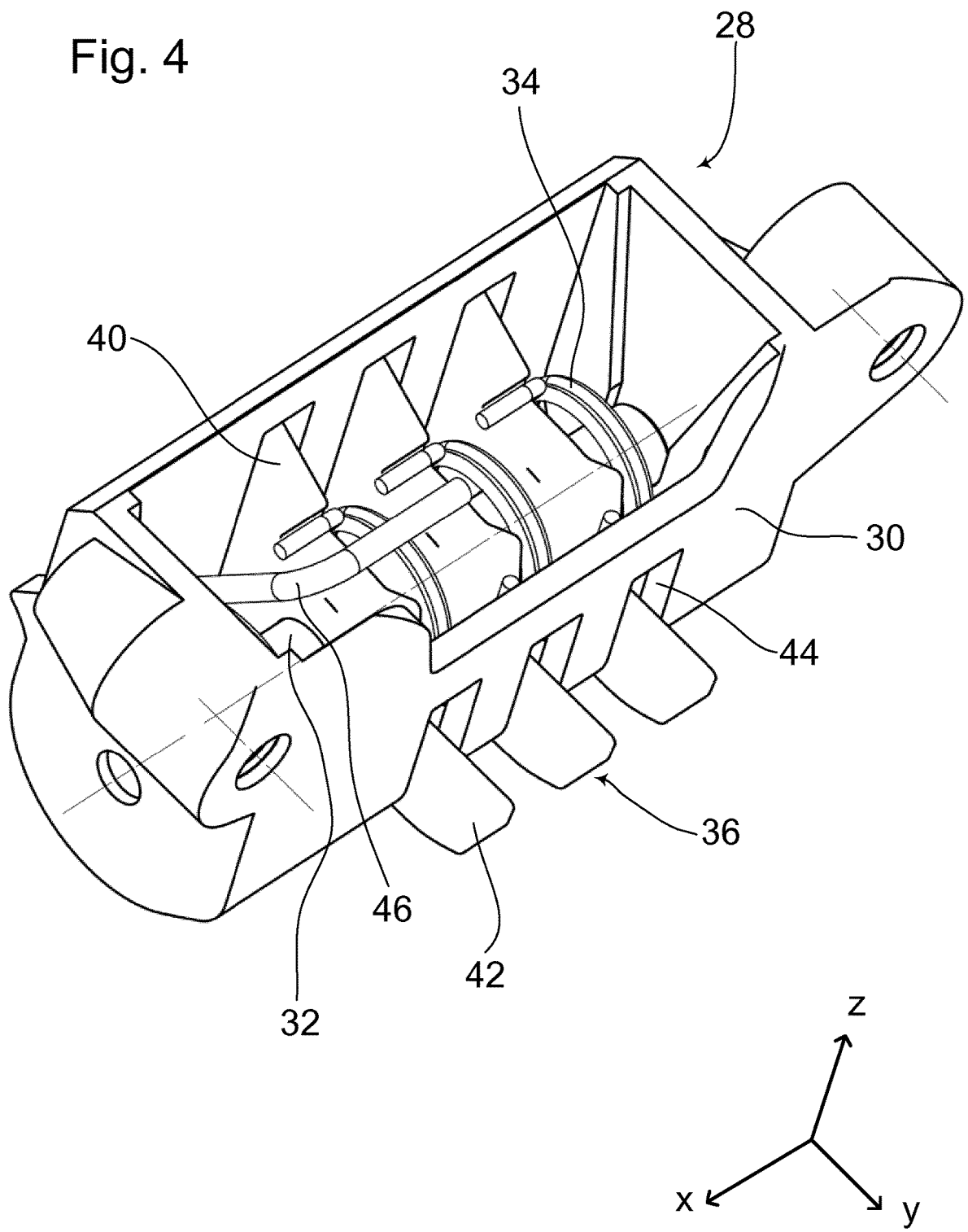

The locking unit 28 has a housing 30, a bearing shaft 32 disposed in this housing 30 and extending in the displacement direction 24, and three structurally identical flat blocking parts 36, which are disposed so as to be pivotable independently of each other about the bearing shaft 32 and which are elastically biased, independently of each other, into a normally existing locking position by one blocking spring 34 of their own each. They are configured, for example, as stamped parts. It further has a releasing part 38 moving the blocking parts 36 together into a releasing position, which is not shown, against the force of their blocking springs 34. FIGS. 1 and 3 each show the locking position.

The housing 30 is open only upwards in the z-direction. In the installed state, see FIGS. 1 and 3, it is sealed on top by a base of the seat rail 22. The housing 30 is connected to and in contact with a leg of the seat rail 22 emanating from this base. Its distance from the opposite leg is as small as possible. That is smaller than the thickness of the profile of the leg. The bearing shaft 32 is fixed in the housing 30. One end, respectively, of each individual blocking spring 34 is supported on the inside of this housing 30; the other end rests on the associated blocking part 36. Viewed in the positive x-direction, it places a load on the respective blocking part 36 in the clockwise direction.

Each blocking part 36 has a first arm 40 and a second arm 42 which is located about 180° opposite thereto with respect to the bearing shaft 32. For each blocking part 36, the housing 30 has two opposite passages 44 through which the arms 40, 42 project freely.

A spring 46, which is disposed around the bearing shaft 32 like the blocking springs 34, is configured, like them, as a leg spring, and is supported, like them, with one extremity on the inside of the housing 30, is disposed in the housing 30. With the other end it rests on the releasing part 38.

One shear slot is situated directly opposite the passage 44. The first arm 40 reaches through a first shear slot 48, the second arm 42 of each blocking part 36 reaches through a second shear slot 50. At least in the event of a load on the longitudinal adjustment device, the arms 40, 42 come into contact with the shear slots 48, 50 and are supported by the respective shear slot. Thus, the seat rail 22 has a number of first shear slots 48 corresponding to the number of blocking parts 36, and an equal number of second shear slots 50.

The floor rail 20 has two perforated strips extending in the displacement direction 24, i.e. a first perforated strip 52 and a second perforated strip 54. The first perforated strip 52 has first blocking slots or windows 56 which are periodically disposed one behind the other in the displacement direction 24, and the second perforated strip 54, correspondingly, has second blocking slots or windows 58 which are periodically disposed one behind the other. The first and second blocking slots 56, 58 are structurally identical. They are located in tightly bent regions of the profile of the floor rail 20. The distance in the y-z-plane between the respective blocking slot 56, 58 and the respectively associated shear slot 48 or 50 is as small as possible, preferably smaller than the thickness of the profile of a rail 20 or 22.

The two rails 20, 22 are mutually hooked into one another in a first clasping region 60 and in a second clasping region 62. Two rows of guide means 64 are located in each case in each clasping region 60 or 62, see FIG. 1. One of the two shear slots 48 or 50 of each blocking part 36 has a stop determining the locking position of the blocking part 36, but the other shear slot does not.

A special bearing arrangement and installation of the bearing shaft 32 in the housing 30 is explained in the following. On the one hand, the following features are a supplement to the teaching as contained in claim 1, on the other hand, the applicant considers the particular bearing arrangement and installation a separate disclosure and reserves the right to prosecute this disclosure in a separate application. A main claim of such a separate application runs as follows:

A longitudinal adjustment device for a vehicle seat having a floor rail 20, a seat rail 22 that is longitudinally displaceable relative to the latter in a displacement direction 24, and a locking unit 28 connected to the seat rail 22 and substantially accommodated in a cavity 26 formed by the two rails, wherein the locking unit 28 has a housing 30, a bearing shaft 32 disposed in this housing 30 and extending in the displacement direction 24, at least two flat blocking parts 36, which are disposed so as to be pivotable independently of each other about the bearing shaft 32 and which are elastically biased, independently of each other, into a normally existing locking position by one blocking spring 34 each, and a releasing part 38 moving the blocking parts 36 into a releasing position against the force of their blocking springs 34, wherein the housing 30, on at least one wall 66, 74 located transversely to the displacement direction, has a depression 68, which is open towards the inside of the housing 30, which extends up to an upper edge 70 of the wall 66, 74 and ends, in the opposite direction (i.e. in the negative z-direction) in an approximately semi-circular accommodating space 72 which, with respect to its diameter, is adapted to the outer diameter of the corresponding end of the bearing shaft 32 and in which the bearing shaft 32 is located in the mounted state, and wherein the wall 66, 74 has a subsequently applied stamped protrusion 73, which projects towards the inside of the housing 30 and blocks the way of the bearing shaft 32 from the accommodating space 72.

Figure 5:
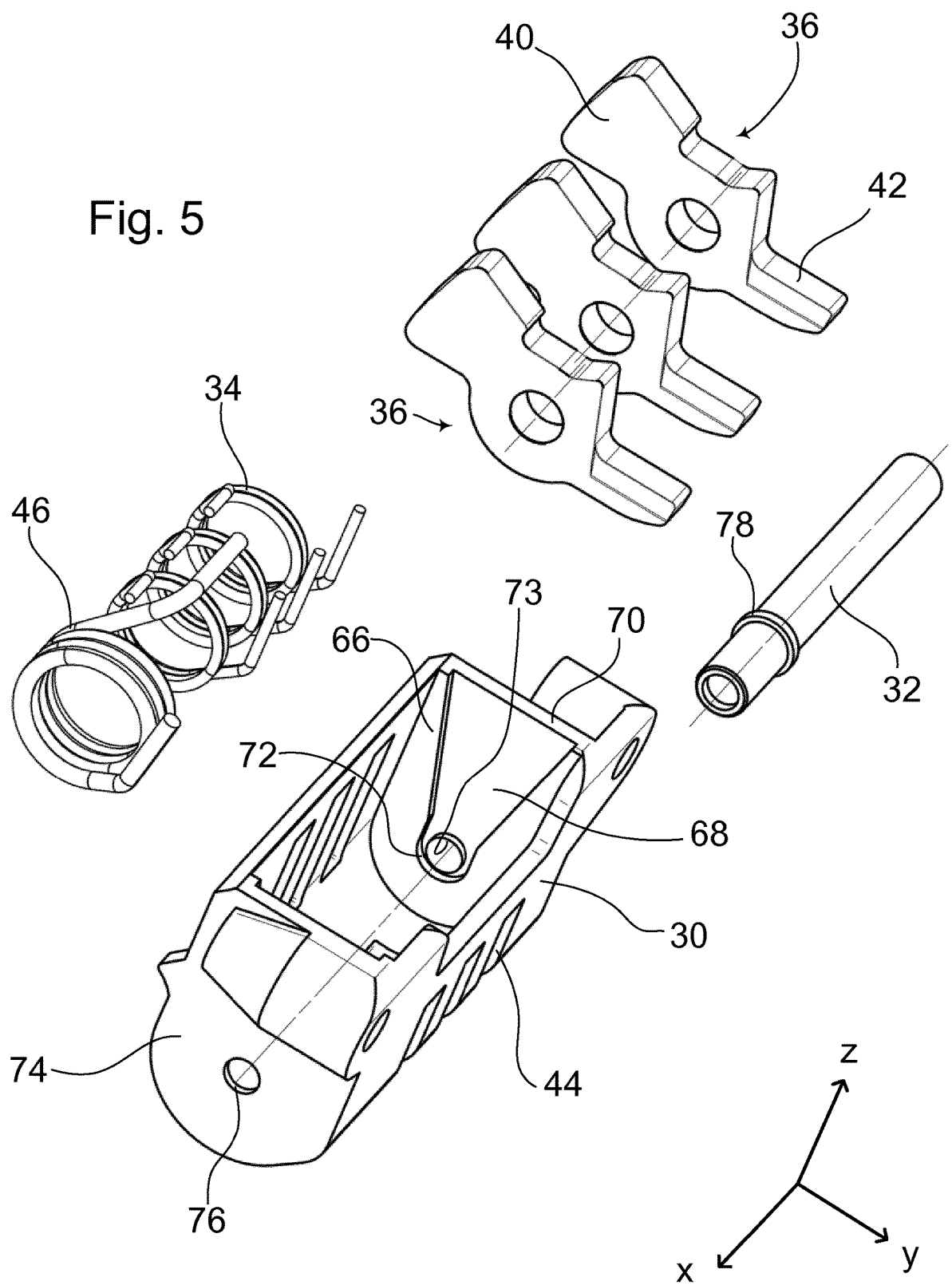

Preferably, the two walls 66, 74 have one depression 68 each. During installation, at least one end of the bearing shaft moves, starting from the upper edge 70, within the depression 68 until it arrives in the accommodating space 72. The stamped protrusion 73 is formed in this position of the bearing shaft 32. In the case of a hollow bearing shaft 32, it is located, for example, within the cavity, as shown in FIG. 5. However, it may also be located above the accommodating space 72, i.e. directly above the bearing shaft 32 in the region of the depression 68. After the stamped protrusion 73 has been formed, the bearing shaft 32 is retained in the housing 30 in a loss-proof manner.

Alternatively, a wall, e.g. the opposite wall 74, may include a bore 76 as an accommodating means, which is adapted to the diameter of the bearing shaft 32 there. During installation, the bearing shaft 32 is inserted into the bore 76 and supported there. Advantageously, the bearing shaft 32 has a collar 78 blocking an axial displacement of the bearing shaft 32 away from the depression 68. The collar 78 rests against the inner face of the opposite wall 74.

In the method for installing the bearing shaft 32 in the housing 30, the former is inserted, starting in the vicinity of the upper edge 70, into the depression 68 at least with one end, preferably with both ends, is guided by the depression and, within it, brought into contact with the accommodating space 72. Finally, the stamped protrusion 73 is formed in the wall 66 or 74. Thereafter, the way of the bearing shaft 32 from the accommodating space 72 is blocked.

Terms like substantially, preferably and the like and indications that may possibly be understood to be inexact are to be understood to mean that a deviation by plus/minus 5%, preferably plus/minus 2% and in particular plus/minus one percent from the normal value is possible. The applicant reserves the right to combine any features and even sub-features from the claims and/or any features and even partial features from a sentence of the description with other features, sub-features or partial features in any form, even outside of the features of independent claims.

The invention claimed is:

1. A longitudinal adjustment device for a vehicle seat, with a floor rail, a seat rail longitudinally displaceable relative thereto in a displacement direction, and a locking unit connected to the seat rail and substantially accommodated in a cavity formed by the two rails, wherein the locking unit has a housing, a bearing shaft disposed in the housing and extending in the displacement direction, at least two flat blocking parts disposed to be pivotable independently of each other about the bearing shaft and which are elastically biased, independently of each other, into an existing locking position by one blocking spring each, and a releasing part moving the blocking parts into a releasing position against the force of their blocking springs,
wherein the blocking parts each have a first arm and a second arm, between which the bearing shaft is located, and a releasing region cooperating with the releasing part,
wherein the seat rail has, for each blocking part, one first shear slot accommodating the first arm and one second shear slot accommodating the second arm, and
wherein the floor rail has a first perforated strip, which cooperates with the first arms, with first closed blocking windows periodically disposed one behind the other in the displacement direction, and a second perforated strip, which cooperates with the second arms, with second closed blocking windows periodically disposed one behind the other in the displacement direction.

2. The longitudinal adjustment device according to claim 1, wherein, perpendicular to the displacement direction, the second closed blocking window is located opposite each individual first closed blocking window.

3. The longitudinal adjustment device according to claim 1, wherein the number of the first closed blocking windows matches the number of the second closed blocking windows.

4. The longitudinal adjustment device according to claim 1, wherein a width of a first closed blocking window measured in the displacement direction is equal to a width of the second closed blocking window which, perpendicular to the displacement direction, is located opposite thereto.

5. The longitudinal adjustment device according to claim 1, wherein, both in the locking position and in the releasing position, the first arm of each blocking part is located in one associated, first shear slot, and the second arm of each blocking part is located in one associated, second shear slot.

6. The longitudinal adjustment device according to claim 1, wherein, in the locking position, a first partial region of the first arm reaching into the first closed blocking window, with respect to the bearing shaft, is offset relative to a second partial region of the second arm of the same blocking part reaching into the second closed blocking window by 180° plus/minus maximally 10° about the bearing shaft.

7. The longitudinal adjustment device according to claim 1, wherein, in the locking position, the clear distance between the first shear slot and the first closed blocking window adjacent thereto and/or the clear distance between the second shear slot and the second closed blocking window adjacent thereto is less than 10%, less than 5% of the largest dimension of the blocking part determined transversely to the displacement direction.

8. The longitudinal adjustment device according to claim 1, wherein the first perforated strip and/or the second perforated strip are located in a profiled region of the floor rail in which the profile is bent by at least 90° about an axis extending parallel to the displacement direction.

9. The longitudinal adjustment device according to claim 1, wherein the first shear slot and/or the second shear slot of each individual blocking part is located in a profiled region of the seat rail in which the profile is bent by at least 70° about an axis extending parallel to the displacement direction.

10. The longitudinal adjustment device according to claim 1, wherein a pivot angle of each individual blocking part between the locking position and the releasing position is in the range of from 20 to 28°.

11. The longitudinal adjustment device according to claim 1, wherein the two rails are mutually hooked into one another in a first clasping region and in a second clasping region, that guide means are located in each clasping region, and that the first perforated strip is located in the immediate vicinity of the first clasping region and/or the second perforated strip is located in the immediate vicinity of the second clasping region.

12. The longitudinal adjustment device according to claim 11, wherein the distance of at least one perforated strip from the guide means is smaller by at least 30% than the distance of this perforated strip from the bearing shaft.

13. The longitudinal adjustment device according to claim 1, wherein the two rails are mutually hooked into one another in a first clasping region and in a second clasping region, that guide means are located in each clasping region, and that the first shear slots are located in the immediate vicinity of the first clasping region and/or the second shear slots are located in the immediate vicinity of the second clasping region, in particular, that their distance from the guide means is smaller by at least 30% than their distance from the bearing shaft.

14. The longitudinal adjustment device according to claim 1, wherein one of the two shear slots of each blocking part has a stop determining the locking position of the blocking part, and the other of the two shear slots does not have a stop.

15. The longitudinal adjustment device according to claim 1, wherein, with respect to the bearing shaft, the first perforated strip is offset relative to the second perforated strip by 180° plus/minus maximally 10° about the bearing shaft.

16. The longitudinal adjustment device according to claim 1, wherein, with respect to the bearing shaft, the first shear slot of the blocking part is offset relative to the second shear slot of the blocking part by 180° plus/minus maximally 10° about the bearing shaft.

17. The longitudinal adjustment device according to claim 1, wherein the housing, on at least one wall located transversely to the displacement direction, has a depression, which is open towards the inside of the housing, which extends in the negative z-direction from an upper edge of the wall to a semi-circular accommodating space which, with respect to a diameter of the semi-circular accommodating space, is adapted to the outer diameter of the corresponding end of the bearing shaft and in which the bearing shaft is located in the mounted state.

18. The longitudinal adjustment device according to claim 1, wherein the housing, on at least one wall located transversely to the displacement direction, has a stamped protrusion blocking a removal of the bearing shaft from a mounted state.

* * * * *